United States Patent [19]
Powell, Jr. et al.

[11] Patent Number: 6,127,934
[45] Date of Patent: Oct. 3, 2000

[54] TRUCK GROUNDING SYSTEM

[75] Inventors: John E. Powell, Jr., Las Vegas, Nev.;
Greg Baack, Aledo, Tex.

[73] Assignee: APLC, Inc., Wilmington, Del.

[21] Appl. No.: 09/056,808

[22] Filed: Apr. 7, 1998

Related U.S. Application Data

[60] Provisional application No. 60/043,064, Apr. 8, 1997.

[51] Int. Cl.[7] ................................................ G08B 21/00
[52] U.S. Cl. .......................... 340/649; 361/215; 361/216
[58] Field of Search .................... 340/649, 652; 361/215, 216, 217; 324/509

[56] References Cited

U.S. PATENT DOCUMENTS

| | | | |
|---|---|---|---|
| 3,040,211 | 6/1962 | Caldwell | 340/649 |
| 4,220,951 | 9/1980 | Bash et al. | 340/649 |
| 4,691,198 | 9/1987 | Mortensen | 340/649 |
| 4,901,195 | 2/1990 | Stemporzewski | 340/649 |
| 5,034,726 | 7/1991 | Blondin | 340/649 |
| 5,159,523 | 10/1992 | Claassen et al. | 340/649 |
| 5,534,856 | 7/1996 | Cadman | 340/649 |
| 5,771,178 | 6/1998 | Stemporzewski et al. | 364/510 |

*Primary Examiner*—Jeffery A. Hofsass
*Assistant Examiner*—Anh V. La
*Attorney, Agent, or Firm*—Mark A. Oathout

[57] ABSTRACT

A system for moving fluids, solids and semisolids through a conduit. The system includes a grounding mechanism, a way to automatically monitor the grounding mechanism, a way to automatically determine whether the grounding mechanism is effective and a way to output monitoring information.

18 Claims, 3 Drawing Sheets

TRUCK GROUNDING SYSTEM

This is a utility application based upon Provisional Application No. 60/043,064, filed Apr. 8, 1997.

I. BACKGROUND

Trucks, such as a vacuum truck, are used to render many types of services in hydrocarbon environments, including the removal of slop oil, sludge and gasoline. When loading, a truck, such as a vacuum truck, functions by creating a sufficient pressure (vacuum) on the tank of the truck to cause material to be pulled into the tank via the hose connected to the truck. When unloading, the procedure is reversed and material is removed from the tank either by gravity feed or because the contents of the tank are put under pressure and the material is more forcibly expelled. In either loading or unloading operations, vapors (or gases) may be given off and the vapors may become flammable when mixed with corresponding levels of oxygen found in the air. The point at which a mixture is flammable can be measured as the lower explosion limit or the "LEL" reading. A situation where a mixture of gases and oxygen measured at the "LEL" level is combined with an ignition source may result in a fire or an explosion.

One type of an ignition source results from the excessive build-up of static electricity. Static electricity may be created by fluid movement through hoses, pipes, or any container, either when loading or unloading. There are several potential locations for static electricity build-up on a vehicle which is typically a truck. For example, static electricity may build up on any of the metal protrusions or parts inside the tank which come into contact with moving fluid. In addition, static electricity may also build up on the hose connected to the truck.

To prevent excessive static electricity build-up within the tank, a grounding cable can be run from the truck chassis to the tank or vessel being emptied or filled to ground the truck chassis. To prevent the hose from being the second potential ignition location, a hand held ohmmeter has been used to check the "ohms" required to ground the hose while one or more hoses are connected together and are being used to load or unload the truck. Either an internal wire on the hose or a separate wire, run externally and connected to the hose at coupled connection points, provides a ground flow path.

However, it has recently been discovered that the systems described above may not be as efficient as originally thought. For example, it has been discovered that worker error can result in a grounding connection which has not been properly established. Although, a meter can be used to check that a proper grounding connection has been established, such a system is dependent on the truck operator. For example, if the truck operator does not read or use an ohmmeter properly, a faulty grounding connection may not be discovered. Also, even after grounding connections are made and confirmed, it is possible that the initiation of fluid movement (e.g., vacuuming) operations may cause the grounding connection to be lost or intermittently interrupted while the truck is in use as a result of equipment or environment changes, an improper set-up or improper operation of the truck. If the ground connection is lost, or interrupted, static electricity may begin to build-up.

Other potential types of ignition sources are the truck motor and the truck electrical system. In addition, the ignition sources which are in close proximity to hydrocarbon fumes in the work area itself (for example, the truck motors and electrical systems of other equipment which may be located near the vacuum truck) may cause the mixture of gases and oxygen to ignite. Presently, a vacuum truck operator may use his/her sense of smell or a hand held "LEL" meter to alert him/her of an LEL danger. These systems function by allowing the truck operator enough time to disable the operation of the truck before an ignition source ignites the gas and oxygen mixture.

SUMMARY OF THE INVENTION

It is an object of this invention to provide a safe, working system which continuously monitors the grounding connection from the truck and the hose which continuously monitors the "LEL" readings in the vicinity of the truck and which takes predetermined actions when preset limits are reached or exceeded.

The computer monitors the ground reading, displays the ground reading for the operator continuously and is programmed with limits which, when violated, give a warning to the operator indicating a limit has been violated. The warning(s) may be auditory and/or visual. An intermittent horn may be used for the auditory warning. Colored lights which flash and indicate a specific area where a potential problem exists may be used for the visual warning. The light panels are located on both sides of the truck, in the back and in the cab as well. The visual warning system includes separate colored lights for each fault system and a corresponding green light to indicate the fault system is on-line or operational. The operator is alerted to the fact that a problem exists and where the problem exists, regardless of his/her location, by sound and by a simple glance at the display.

Another object of the invention is to automatically disable the truck's operations if a threshold limit has been or continues to be violated. The computer may be programmed to disable the operations of the truck (e.g. the power supply to the vacuum will be stopped) once the threshold limit has been violated. This gives the operator time to check the display signal or lights which will indicate the specific location, type and degree of a potential problem. Truck operations can be restarted once the problem has been corrected and the computer fault system has been cleared.

Another object of the invention is to read and monitor the LEL level in the area of the truck. To accomplish this, an LEL meter is mounted in the cab of the truck. The LEL meter is connected to an air pump which pulls in air from a region of measurement outside but near the truck. The LEL readings are fed into the computer monitoring system for comparison to an LEL limit to determine if the limit is violated. The computer can be programmed to automatically disable operations once a limit is violated. The audio and visual warning systems are also tied into the LEL monitoring system.

Certain embodiments of this invention are not limited to any particular individual features disclosed, but include combinations of features distinguished from the prior art in their structures and functions. Features of the invention have been described so that the detailed descriptions that follow may be better understood, and in order that the contributions of this invention to the arts may be better appreciated. These may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. This invention is to be read to include any legally equivalent devices or methods which do not depart from the spirit and scope of the present invention.

The present invention recognizes, addresses and meets the previously-mentioned preferences or objectives in its various possible embodiments and equivalents thereof. To one of skill in this art who has the benefit of this invention's realizations, teachings, disclosures, and suggestions, other purposes and advantages will be appreciated from the following description and the accompanying drawings. The detail in the description is not intended to thwart this patent's object to claim this invention no matter how others may later disguise it by variations in form or additions of further improvements. These descriptions illustrate certain preferred embodiments and are not to be used to improperly limit the scope of the invention which may have other equally effective or legally equivalent embodiments.

BRIEF DESCRIPTION OF THE DRAWINGS

FIG. one is an elevational schematic view of the invention.

FIG. two is a perspective view of a display used in the invention.

FIG. three is a schematic diagram of the computer monitoring system used in the invention.

DETAILED DESCRIPTION OF THE PREFERRED EMBODIMENT OF THE INVENTION

Figure 1:
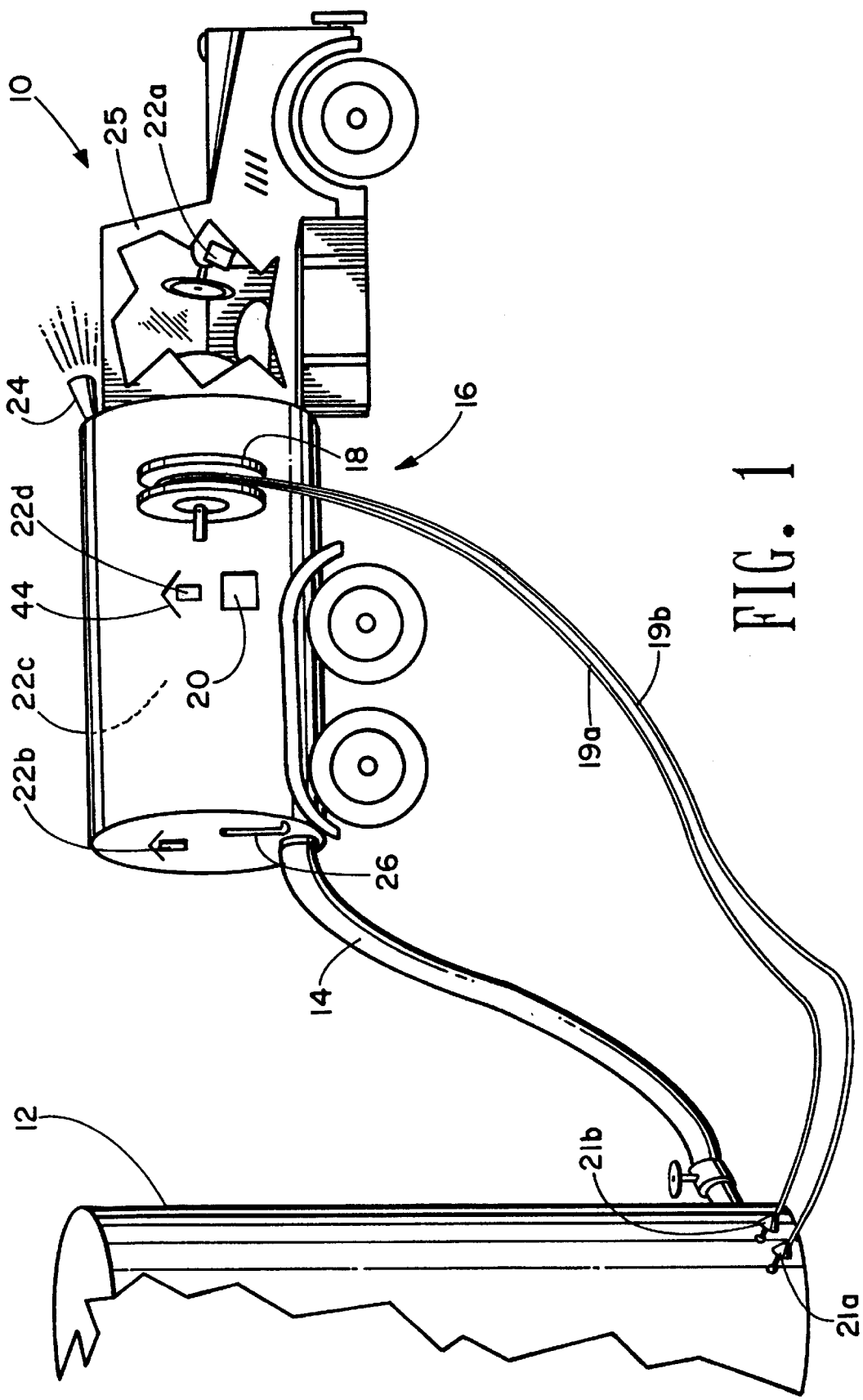
Figure 2:
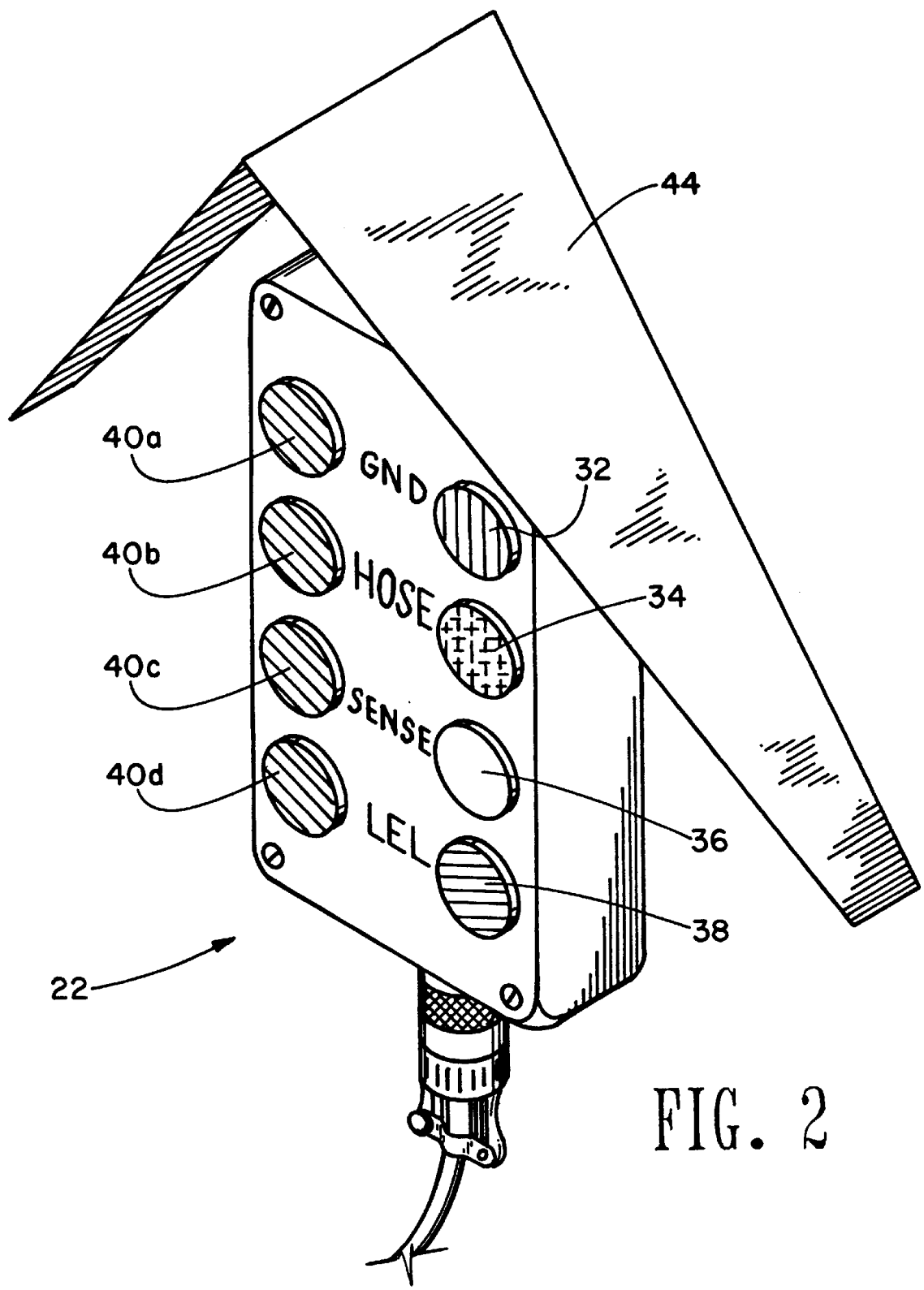
Figure 3:
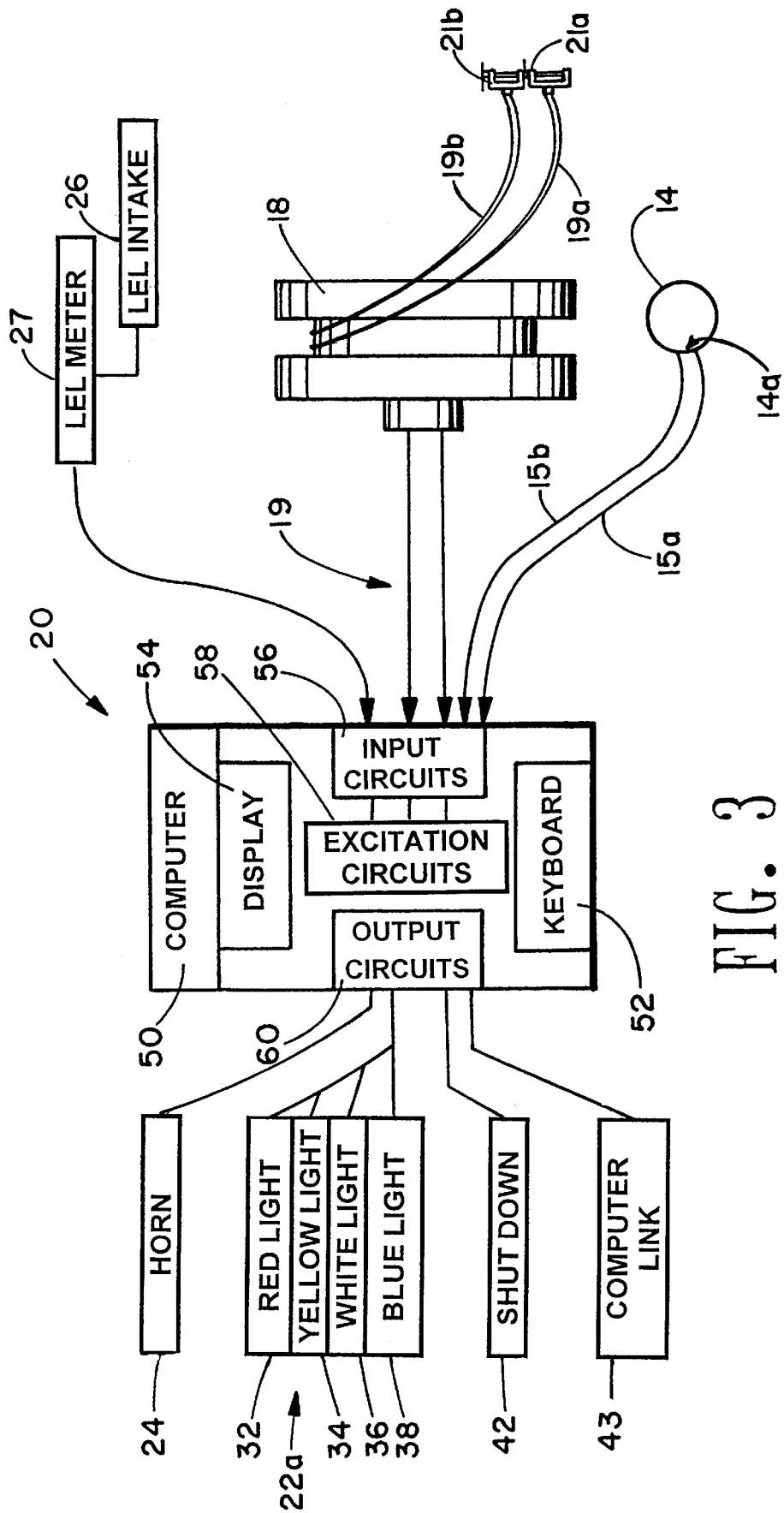

Referring to FIGS. 1–3, the improved truck grounding system generally includes a truck 10 proximate a petrochemical tank 12 for loading or unloading fluids, solids and/or semisolids to or from the tank 12. A hose 14 is connected to the chassis 16 at one end of the truck 10 and is connected at the other end to the tank 12. The hose 14 is manufactured with an internal conducting line 14a. When the hose 14 is coupled to the tank 12 to be cleaned, the internal line is grounded through the coupling. The hose 14 is continuously monitored via ground and sense lines 15a, b for detecting when the hose 14 is not properly grounded. When the hose 14 is uncoupled to, for example, perform operations within the tank 12 a violation would be detected when the grounding connection is lost. To compensate, the computer monitoring station 20 is programmed to operate with a by-pass mode such that when the hose grounding connection is uncoupled this grounding connection will not be monitored while the grounding connection of the truck chassis continues to be monitored. Another option is to connect one end of a wire to the end of the hose 14 and the other end of the wire to the tank 12 or other grounding device. The hose 14 can then be transported to perform the necessary operations while still grounded and the system continues to monitor the hose grounding connection. Other suitable structures, such as a pipe, may be substituted for the hose 14 and monitored by the present invention.

A reel 18 connected to two grounding or conducting leads 19a and 19b, is connected to the chassis 16. The other end of the grounding leads 19a and 19b are adapted to be connected or grounded to the tank 12 or to some other grounding connection. The grounding leads 19a and 19b are monitored to detect an improper ground. The reel 18 is used to automatically spool up the duel grounding leads 19a and 19b. Normally, one lead 19a functions as the actual ground lead and the other 19b as the sense lead. However, either can function as a grounding connection if the other is released or inadequate since both leads 19a and b are actually grounded to the chassis 16 and the computer monitoring station 20 functions to keep at least one of the leads as a ground. This is also helpful as it provides an extra ground lead when the hose grounding connection is bypassed. The grounding leads 19a and 19b have strong, durable welding shop c-clamps 21a and 21b with piercing edges (not shown) or other suitable clamps to aid in obtaining and maintaining a good connection and hence a good ground on rusty or painted surfaces.

A computer monitoring station 20 is mounted on the chassis 16. The computer monitoring station 20, continuously generates, receives and processes electrical signal(s) for LEL levels, actual resistance or ohms to ground and outputs separate readings for LEL levels, the truck 10 (or chassis 16) and for the hose 14. More specifically, the LEL meter 27, the ground and sense leads 19a and 19b and the ground and sense leads 15a and 15b generate the excitation signals and the computer monitoring station 20 measures the resulted signals, processes the data into engineering units and displays the information on a computer screen 54. The keyboard 52 is used by the operator to communicate with the computer 50. Input circuits 56 detect and amplify (if necessary) the incoming signals. Excitation circuits 58 "drive" the ground and sense leads 19a and 19b, and 15a and 15b. Output circuits 60 control and link to optional devices such as a horn 24, displays 22a–d, operations shut-down 42, or other computer links 43. An acceptable computer monitoring station 20, its interfaces, and operations relating to same, used in the present invention is commercially available from a company named E.R.A.D. located in Fort Worth, Tex. A recorder such as, by way of example, a digital data logger or a small printer (both not shown) may be added to the system to record data. The digital data recorder could also store references for calibration to allow the operator to verify the system is operational for use, especially when the system is booted up. Other optional safeguards include, for example, the computer monitoring station 20 may require the entry of an "i.d." code or "password" in order to allow an operator to change the parameters of the system. Also, when the computer monitoring station 20 is operating in the mode where the hose 14 ground is not monitored, an extra light on the display 22 can be used to indicate the by-pass mode is operational.

Four displays 22a, b, c and d are mounted on the truck 10. Display 22a is mounted inside the cab 25. Display 22b is mounted on the back of the truck 10. Display 22c and d are mounted one on each side of the truck 10.

A horn 24 or other audio warning device is mounted on the truck 10. An LEL air monitoring intake 26 is also mounted on the truck 10. The LEL monitoring intake 26 such as a hard plumbed explosive vapor meter can be placed anywhere outside the truck 10 and is preferably located in the area the operator feels has the greatest possibility of becoming contaminated first. Additional LEL monitoring intakes (not shown) may be mounted in other locations, such as, for example, near the engine (not shown) since the engine can pull in vapors and the engine is an ignition source for flammable or explosive vapors. The actual LEL meter 27 (FIG. 3) is located in the cab of the truck 10 and communicates directly with the computer to monitor LEL levels.

The four displays 22a, b, c and d allow an operator to visually check the status and integrity of the system. Each display 22 includes four colored lights 32, 34, 36 and 38. For example, the status of the grounding connection for the truck chassis 16 may be displayed with a red light 32; the status of the grounding connection of the hose 14 may be displayed with a yellow light 34; the status for the checking sense lead may be displayed with a white light 36; and the status of the LEL reading may be displayed with a blue light 38. Each display 22 also includes green lights 40 corresponding to each of the colored lights 32, 34, 36 and 38. Green lights 40a–d indicate the corresponding systems are energized and operational. The display lights 32, 34, 36 and 38 may have a legend or are labeled to briefly describe what each light means. Each display may include a hood assembly 44 to help the operator read the display 22 in sun glare and to help protect the displays 22 from the elements such as rain, sleet, grit, sun, wind, etc. The lights 32, 34, 36 and/or 38 blink on and off once the computer monitoring station 20 determines a limit has been violated and the corresponding green lights 40a–d may remain on to indicate the system is still operational or may be turned off by the system to further confirm the violation. Truck operations are automatically shut down by the computer once certain specified limits are violated. The computer monitoring station 20 includes a computer 50, an operator's control panel or keyboard 52 and a computer screen 54 (FIG. 3). The computer screen 54 is equipped with a back light for night time monitoring. The computer screen 54 also includes a read-out for the hose grounding connection and the truck chassis grounding connection (e.g., "hose twenty ohms" and "truck fifty ohms").

It is generally accepted that a reading or detection of resistance from zero to eighty nine ohms indicates a sufficient ground. A resistance reading of from ninety to one hundred ohms indicates a border line ground. Depending on the circumstances it may be desirable to input a border line resistance as a limit to trigger a warning but not a shutdown. A reading above one hundred ohms indicates an improper ground. One of ordinary skill in the art would appreciate how these parameters can be customized through the programming capabilities of the computer. One also has the ability to individually customize monitoring of the truck chassis grounding connection, the hose grounding connection and the LEL reading. By way of example, an operator could lower the limits for the truck chassis ground, the hose ground and the LEL reading when operating in an environment having highly volatile hydrocarbons, or an area having the possibility of a flammable gas release (e.g. a pipeline containing propane or natural gas). The parameters could be set with higher limits when working with lower risk materials such as aqueous materials.

The computer is sealed to protect it from harsh environmental elements which may be present. The computer is equipped with a tattle tale breaker such that, in the event the monitoring system disables the truck 10, the breaker must be reset to reactivate the truck. The breaker disables truck operations until all systems have been checked or reset. The computer is also equipped with an "on" and "off" switch so the system can be turned off when the truck is driven down the road, when the operator is setting up to do a job, etc.

The horn 24 may be set up to sound intermittently when the computer monitoring station has detected the violation of border line limit and to sound continuously when grounding or an LEL level is improper and operations are disabled. This helps the operator to immediately recognize the severity of the situation through an auditory signal which is extremely beneficial when the operator cannot readily view the truck. The computer may also be programmed to by-pass the operation of the horn 24 or to customize the operation of the horn 24 for grounding connection monitoring independent from the LEL monitoring.

The invention is not limited to use for vehicles and/or vacuum operations only. It may be incorporated into other systems where grounding and/or LEL monitoring are desired. For example, the system may be used as a permanent installation at a loading terminal or dock; grounding systems for ships or vessels; grounding systems for a crane where the crane is not sitting on the same platform as the object the crane is picking up; situations where a steel structure, such as a tower, must be grounded; air frame grounding to determine whether an airframe is grounded to either the ground or a field truck and to determine if the field truck is grounded; and/or situations where one would want to monitor whether an object ever becomes grounded or grounded below a certain resistance value.

In conclusion, therefore, it is seen that the present invention and the embodiments disclosed herein are well adapted to carry out the objectives and obtain the ends set forth. Certain changes can be made in the subject matter without departing from the spirit and the scope of this invention. It is realized that changes are possible within the scope of this invention and it is further intended that each element or step recited is to be understood as referring to all equivalent elements or steps. The description is intended to cover the invention as broadly as legally possible in whatever form it may be utilized.

What is claimed is:

1. A system for moving fluids, solids and/or semisolids through a conduit comprising:
   a. A grounding mechanism;
   b. A means for automatically monitoring the grounding mechanism;
   c. A means for automatically determining the effectiveness of the grounding mechanism;
   d. A means for taking an LEL reading mounted in the vacinity of the system;
   e. A means for continuously monitoring the LEL reading; and
   f. A means for outputting information generated by the grounding mechanism monitoring means and the LEL reading monitoring means to a user.

2. The system for moving fluids, solids and/or semisolids through a conduit according to claim 1 wherein the outputting means comprises a shut down operation.

3. The system for moving fluids, solids and/or semisolids through a conduit according to claim 1 wherein said grounding mechanism comprises a hose with a conducting line.

4. The system according to claim 3, further including a second grounding mechanism comprising a grounding lead connected between a chassis of the system and a ground connection.

5. The system according the claim 4, wherein said second grounding mechanism further comprises a second grounding lead connected between the chassis and a ground connection.

6. The system according to claim 5, further including an input device having a means for inputting a limit to the grounding mechanism monitoring means and for inputting a limit to the LEL reading monitoring means.

7. The system for moving fluids, solids and/or semisolids through a conduit according to claim 1 further including a second means for taking an LEL reading mounted in another location in the vacinity of the system.

8. The system for moving fluids, solids and/or semisolids through a conduit according to claim 1 wherein said grounding mechanism comprises a hose with conduction means from a grounding device to a device to be grounded and a grounding lead from the grounding device to the device to be grounded.

9. The system for moving fluids, solids and/or semisolids through a conduit according to claim 1 wherein said means for automatically monitoring the status of the grounding mechanism comprises a computer, and an input device.

10. The system for moving fluids, solids and/or semisolids through a conduit according to claim 9, wherein said outputting means is an audible device including a first sound activated when a borderline limit is violated and a second sound activated when an improper limit is violated wherein said borderline limit and said improper limit are input to the input device.

11. The system for moving fluids, solids and/or semisolids through a conduit according to claim 1 wherein said outputting means is a visual display including a chassis grounding light, a hose grounding light, a sense lead light and an LEL status light.

12. The system for moving fluids, solids and/or semisolids through a conduit according to claim 1 wherein said outputting means is an audio-visual device.

13. A method of moving fluids, solids and/or semisolids through a conduit comprising the following steps:

a. Connecting a conduit between a grounding device and a device to be grounded;

b. Connecting a grounding mechanism containing a grounding lead and a sense lead;

c. Setting a plurality of ground value limits considering the particular substance to be moved;

d. Generating drive signals for the ground and the sense leads of the grounding mechanism;

e. Moving fluids, solids and/or semisolids through the conduit;

f. Measuring the resulting incoming signals from the grounding lead, the sense lead and the conduit grounding device;

g. Processing the data;

h. Comparing the ground value limits with the processed data;

i. Setting an LEL limit, continuously reading an LEL level and comparing the LEL level reading to the LEL limit to determine whether the LEL limit is violated; and j. Communicating an appropriate output signal.

14. The method of moving fluids, solid and/or semisolids through a conduit according to claim 13 wherein said step of communicating the appropriate output signal includes a warning when the grounding lead and/or the conduit grounding measure about 90 to about 100 ohms.

15. The method of moving fluids, solid and/or semisolids through a conduit according to claim 13 wherein said step of communicating the appropriate output signal includes a shut down when the grounding lead and/or the conduit grounding measure greater than about 100 ohms.

16. The method of moving fluids, solid and/or semisolids through a conduit according to claim 13 wherein said step of connecting the grounding mechanism further includes the step of losing the grounding lead and using the sense lead as a back-up grounding lead.

17. The method of moving fluids, solid and/or semisolids through a conduit according to claim 13 wherein said step of communicating the appropriate output signal comprises taking an action coming from the group consisting of a plurality of audible warnings, and a plurality of visual warnings.

18. The method for moving fluids, solids and/or semisolids through a conduit according to claim 13 further including a second step for continuously reading an LEL level and comparing the second LEL level reading to the LEL limit.

* * * * *